Patented June 11, 1940

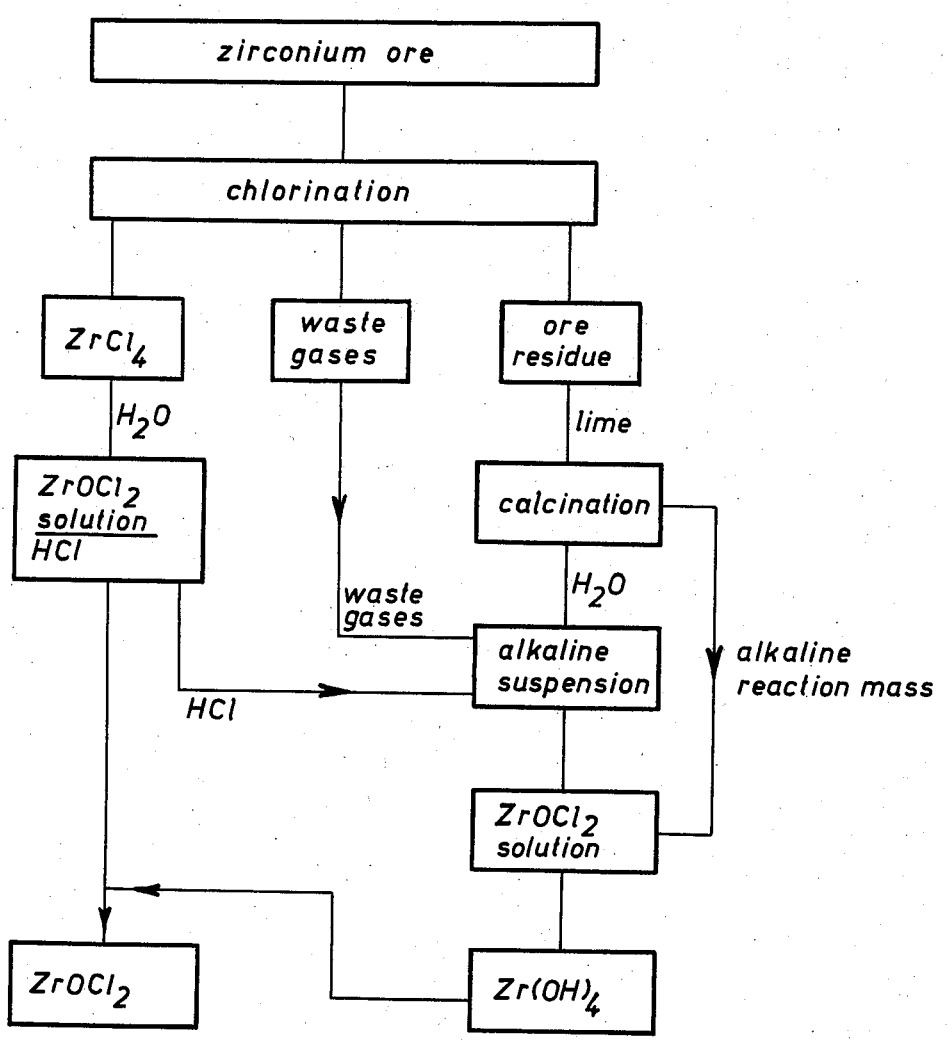

2,204,454

UNITED STATES PATENT OFFICE 2,204,454

PROCESS FOR DECOMPOSING ZIRCONIUM ORE

Ludwig Teichmann and Hans Martini, Leverkusen-I. G. Werk, Germany, assignors to I. G. Farbenindustrie Aktiengesellschaft, Frankfort-on-the-Main, Germany Application October 20, 1938, Serial No. 236,040
In Germany October 30, 1937

4 Claims. (Cl. 23—22)

The present invention relates to a process for the decomposition of zirconium ores containing a substantial amount of zirconium oxide and zirconium silicate.

The decomposition of zirconium ores by treatment with chlorine is already known. The decomposition nearly always proceeds either by treating the zirconium ore mixed with carbon at a temperature of about 800–1000° C. in the presence of chlorine or by treating the ore with a mixture of carbon monoxide and chlorine or phosgene, respectively, at a relatively low temperature, for instance at 400–600° C. As starting material only oxidic ores can be used in this process because zirconium silicate is only attacked and decomposed above 1000° C., for instance at 1200° C. As reaction product zirconium tetrachloride is obtained, which—when dissolved in water—yields zirconium oxychloride and hydrochloric acid according to the equation $$ZrCl_4 + H_2O = ZrOCl_2 + 2HCl.$$

Also processes for the alkaline decomposition of zirconium ore are known. These processes consist in heating zirconium ore with alkali metal hydroxide, alkali metal carbonate or preferably with lime or other alkaline earth metal oxides or carbonates because lime—in contradistinction to the alkalies—does not melt at the temperatures needed of about 900–1100° C. In order to work up the calcined mixture of lime and zirconium ore, the same is dissolved in acid, the solution obtained separated from the silicic acid, and suitable salts, for instance crystalwater containing zirconium oxychloride is crystalised from the solution.

In accordance with the present invention it has been found that zirconium ore containing a substantial amount of zirconium oxide is advantageously decomposed by chlorinating the zirconium ore at a temperature of about 400–1000° C. until a substantial amount of the zirconium is transformed into zirconium tetrachloride and subjecting the ore residue resulting from this treatment to an alkaline decomposition treatment at a temperature of about 800–1200° C. That is to say the zirconium ore is subjected to an incomplete chlorinating decomposition, whereby it is sufficient to pass the ore through the chlorination furnace at a relatively high velocity in counter current to the chlorination agent. Thus a high zirconiumtetrachloride output of this apparatus is obtained and—at the same time—a far reaching utilization of the chlorine, because continuously new ore runs in opposite direction to the waste gases. Zirconium silicate and some zirconiumdioxide which has not been attacked remains, while zirconium tetrachloride evaporates and is obtained in solid form by cooling. It can be used as such or dissolved in water, whereby zirconium oxychloride and hydrogen chloride are formed. The ore residue resulting from the chlorination treatment is now calcined with lime at 800–1200° C. in the usual manner, whereby nearly all the zirconium is transformed into an acid soluble form. For the dissolution of the calcined alkaline material suitably the waste gases of the chlorinating decomposition are used; they contain some chlorine which has not been used up and the hydrochloric acid obtained from the untransformed phosgene, by interaction with water or aqueous solutions, and, above all, the hydrochloric acid developed during the dissolution of the zirconiumtetrachloride in water. The solution obtained, containing zirconium oxychloride and the chloride of the alkaline decomposition agent e. g. calcium chloride is filtered or decanted from the silicic acid and worked up in the usual manner to zirconium hydroxide or other zirconium compounds. Washing with an aqueous alkaline medium or other methods to remove the chlorine from the waste gases of the decomposition is therefore superfluous; at the same time the chlorine is completely used up, while, when working without the alkaline after washing the chlorine is only used up to 70–75%. Simultaneously the zirconium ore decomposition is increased. When starting with a zirconium ore of 80–85% of ZrO_2 there are obtained according to the chlorinating decomposition process 75–80% of the zirconium. When calcining with lime a decomposition of 90% of this residue is easily obtained, so that it is possible to obtain a yield of about 97% of the zirconium present in the ore. Without using the alkaline process about 10% of the zirconium would not be used up, even when remaining longer, e. g. one and a half times as long in the furnace and at the cost of wasting chlorine. In accordance with the new process it is also possible to use the widely spread and cheap zirconium ores which are rich in silicic acid without loosing a considerable part of the zirconium. With regard to the purely alkaline decomposition it is possible to easily bring the chief quantity of the zirconium into a water soluble form as zirconiumtetrachloride, to obtain high concentrated solutions, and to save the acid necessary for the dissolution of the alkaline calcined material and the neutralisation of the lime, by using up of the waste gases.

The process can also be effected by separating the chief quantity of the silicic acid in the acid medium in the described manner, and adding a further quantity of the alkaline reaction mass obtained in the calcination treatment of the ore with an alkaline agent e. g. lime. Calciumchloride or an other chloride remains dissolved, while the hydroxides of zirconium, titanium, iron and silicic acid are precipitated. The precipitated hydroxides are separated from the solution and poured into the hot hydrochloric zirconium oxychloride solution which is obtained at the dissolution of the zirconiumtetrachloride in water. By this second working method highly concentrated solutions are obtained from which the chief quantity of alkaline decomposition agent e. g. lime and silicic acid has already been removed. This process is illustrated in the accompanying flow sheet. The process is further illustrated by the following example without being restricted thereto:

1000 kg. of a zirconium ore ground to a fineness of 5–10 mm. containing about 60% of $ZrO_2$, 35% of $ZrO_2.SiO_2$ and 5% of impurities such as titanium dioxide, and iron oxide are heated in a revolving furnace to about 500–600° C. while introducing 530 kg. of phosgene in counter current to the ore. About 1020 kg. of zirconium tetrochloride are formed and sublimed into a sublimation vessel. The zirconium tetrachloride is dissolved in 2000 kg. of water which is heated by the reaction temperature to about 90° C. while 322 kg. of hydrochloric acid gas are formed. The ore residue resulting from the chlorination treatment, about 460 kg. containing about 292 kg. of $ZrO_2$, are mixed with 290 kg. of lime and heated in a revolving furnace to 1000–1100° C. for about 3½ hours. The alkaline reaction mass obtained is suspended in 2500 kg. of water. Into the suspension the waste gases of the chlorination treatment and the hydrochloric acid gas obtained in the decomposition of the zirconium tetrachloride in water are introduced until the suspension reacts acid. The zirconium is thereby transformed into zirconium oxychloride, the calcium into calcium chloride and the silicic acid is precipitated. The silicic acid is removed from the solution by decantation or filtration and such an amount of alkaline decomposition mass is added to the solution, that it reacts alkaline. The zirconium is precipitated as zirconium hydroxide, while the calcium chloride remains dissolved. The zirconium hydroxide is filtered or decanted and dissolved in the hot aqueous acid solution of zirconium oxychloride. From this solution zirconium oxychloride crystallizes in an amount of about 2000 kg. of $ZrOCl_2$.aqu containing 40% of $ZrO_2$.

We claim:

1. Process for decomposing zirconium ore containing a substantial amount of zirconium oxide which comprises chlorinating the zirconium ore at a temperature of about 400–1000° C. until a substantial amount of the zirconium ore is transformed into zirconium tetrachloride, decomposing the zirconium tetrachloride with water, subjecting the ore residue resulting from the chlorinating treatment to an alkaline decomposition treatment at a temperature of about 800–1200° C. and forming a suspension of the alkaline reaction mass in water and acidifying the suspension with the hydrochloric acid obtained in the decomposition of the zirconium tetrachloride with water and the waste gases obtained in the chlorination of the ore.

2. Process as claimed in claim 1 in which the alkaline decomposition treatment is performed by means of lime.

3. Process for decomposing zirconium ore containing a substantal amount of zirconium oxide which comprises chlorinating the zirconium ore at a temperature of about 400–1000° C. until a substantial amount of the zirconium ore is transformed into zirconium tetrachloride, decomposing the zirconium tetrachloride with water, subjecting the ore residue resulting from the chlorinating treatment to an alkaline decomposition treatment at a temperature of about 800–1200° C. and forming a suspension of the alkaline reaction mass in water and acidifying the suspension with the hydrochloric acid obtained in the decomposition of the zirconium tetrachloride with water and the waste gases obtained in the chlorination of the ore, removing the silicic acid, adding such an amount of the alkaline reaction mass that the solution reacts alkaline and the zirconium is transformed into zirconium hydroxide removing the zirconium hydroxide and dissolving it in the hot zirconium oxychloride solution resulting from the decomposition of the zirconium tetrachloride with water.

4. Process as claimed in claim 3 in which the alkaline decomposition treatment is performed by means of lime.

LUDWIG TEICHMANN.
HANS MARTINI.